United States Patent [19]

Ando

[11] Patent Number: 4,694,443
[45] Date of Patent: Sep. 15, 1987

[54] OPTICAL SYSTEM FOR TRACKING AN INFORMATION RECORDING MEDIUM

[75] Inventor: Hideo Ando, Tokyo, Japan

[73] Assignee: Kabushiki Kaisha Toshiba, Kawasaki, Japan

[21] Appl. No.: 713,598

[22] Filed: Mar. 19, 1985

[30] Foreign Application Priority Data

Mar. 22, 1984 [JP] Japan .................. 59-53524

[51] Int. Cl.$^4$ .............................................. G11B 7/00
[52] U.S. Cl. ................................... 369/46; 250/201
[58] Field of Search ........................ 369/44, 45, 46; 250/201 DF

[56] References Cited

U.S. PATENT DOCUMENTS

| | | | |
|---|---|---|---|
| 3,876,841 | 4/1975 | Kramer et al. | |
| 3,971,002 | 7/1976 | Bricot et al. | 369/46 |
| 4,079,248 | 3/1978 | Lehureau et al. | 250/201 |
| 4,115,809 | 9/1978 | Ueno. | |
| 4,349,901 | 9/1982 | Howe | 369/45 |
| 4,422,168 | 12/1983 | Ito et al. | 369/45 |
| 4,466,087 | 8/1984 | Cheng | 369/45 |
| 4,517,666 | 5/1985 | Ando | 369/45 |
| 4,521,680 | 6/1985 | Ando | 369/45 |
| 4,525,826 | 6/1985 | Nakamura et al. | 369/46 |
| 4,547,872 | 10/1985 | Henmi et al. | 369/45 |
| 4,585,933 | 4/1986 | Ando | 250/201 |

FOREIGN PATENT DOCUMENTS 2810566  9/1978  Fed. Rep. of Germany.
2918931 11/1979  Fed. Rep. of Germany.
3142125  7/1982  Fed. Rep. of Germany.

Primary Examiner—Donald McElheny, Jr.
Attorney, Agent, or Firm—Cushman, Darby & Cushman

[57] ABSTRACT

In an optical system for tracking an optical disk with multiple beams, recording, reproduction and guide laser beams are converged by an objective lens onto a tracking guide formed by a light reflecting surface of the optical disk. The laser beams reflected from the light reflecting surface are transferred to a half mirror and are split into a first and a second set of laser beams. The first set of laser beams are also converged by a projection lens onto a first photodetector. A knife edge is located in the optical path of the first set of laser beams. Accordingly, a part of the first set of laser beams are shielded by the knife edge, and the other part of the first set of laser beams are incident on the first photodetector. The photodetector has first and second photosensitive region, regions, a photosensitive region and a third photosensitive region. The reproduction laser beam of the first set of laser beams is detected by the first and second photosensitive region to generate a focusing signal, the recording beam of the first set of laser beams is attenuated by the photoinsensitive region, and the guide beam of the first set of laser beams is detected by the third photosensitive region.

19 Claims, 11 Drawing Figures

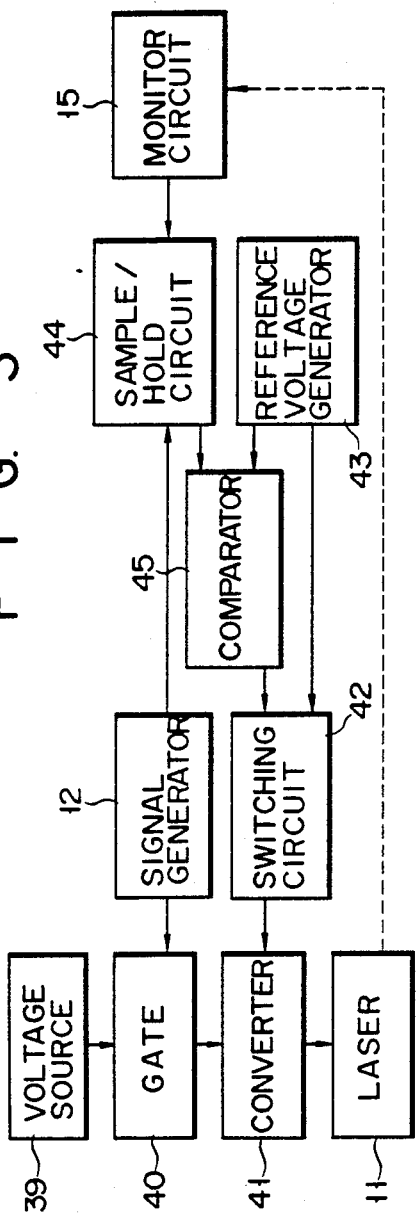
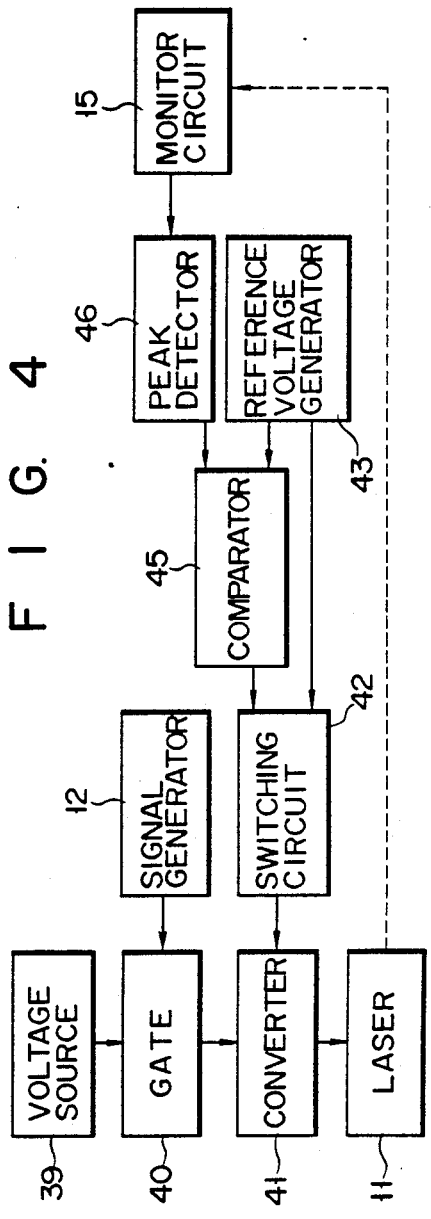

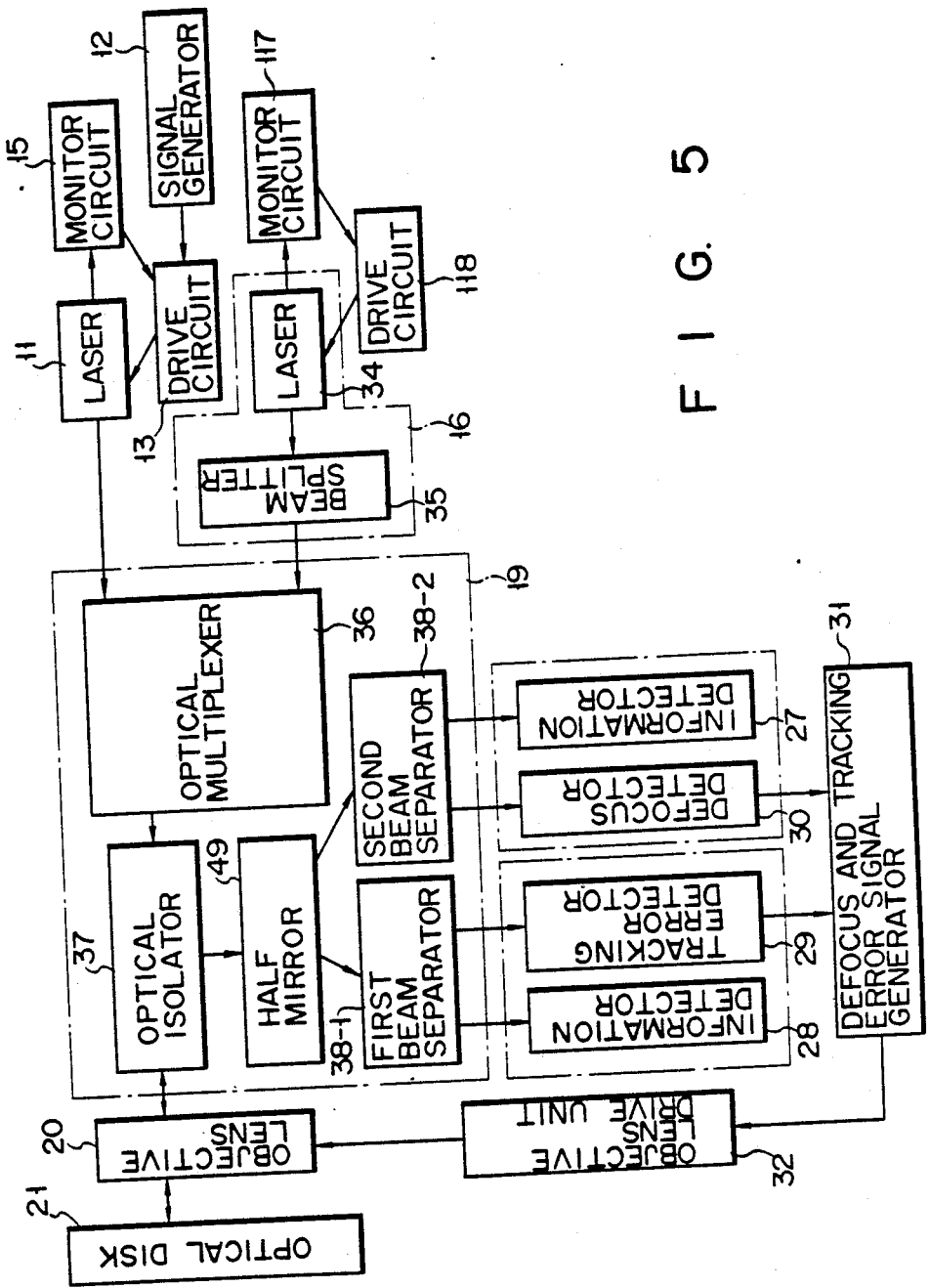
F I G. 5

OPTICAL SYSTEM FOR TRACKING AN INFORMATION RECORDING MEDIUM

BACKGROUND OF THE INVENTION

The present invention relates to an optical system for tracking an information recording medium such as an optical disk with multiple beams for information recording and reproduction, or for tracking a medium for information recording, reproduction and erasure so as to record information in and reproduce it from the information recording medium or to record information in and reproduce and erase it therefrom. More particularly, it relates to an optical system for detecting the focusing state of an objective lens for focusing the multiple beams.

Various types of optical heads have been recently developed and made commercially available to record information in or reproduce it from an optical disk. In such an optical head, a laser beam which is intensity-modulated by information to be recorded is focused by an objective lens onto a recording surface of a rotating optical disk, and the state of regions on the recording surface is continuously changed. For example, apertures such as pits are formed in the recording surface, or optical characteristics such as a refractive index and a reflectance are changed to record information in the recording surface of the optical head. A reproduction laser beam is focused by the objective lens onto such a recording surface, and the reproduction laser beam is intensity-modulated by the changed states of the regions. The reproduction laser beam is converted by a photodetector to electrical signals, thereby reading out the information.

Another conventional optical disk is also known which comprises a tracking guide for specifying a region or area in which information is to be recorded. In this type of optical head, the reproduction beam is focused in both the reproduction and recording modes. In the recording mode, the reproduction beam is used to check whether or not information is properly recorded in the tracking guide. In such an optical head, since the reproduction light beam traces the region after the recording beam has tracked it, the recording beam inevitably extends outside the recording region. Thus, a region outside the recording region is damaged by the recording beam. In addition, if there is a defective portion in the tracking guide, since it cannot be detected, information is written in the defective portion. In this case, information cannot be recorded or erroneous information is recorded in the defective portion.

In order to solve this problem, a prebeam is converged on the optical disk in addition to the recording and reproduction beams. An optical head of this type is described in U.S. Ser. No. 673,764, abandoned, filed on Nov. 21, 1984, abandoned, and in a corresponding EPC Application No. 84114044.5 filed on Nov. 20, 1984 wherein the region tracked by the prebeam is tracked again by the recording and reproduction light beams. In such an optical head, a plurality of light beams are incident on the optical disk at slightly different incident angles, and a plurality of light beams reflected by a light reflecting surface of the optical disk are guided to a tracking guide and focusing state detecting optical system. In this system, a plurality of beams are separated to cause a single light beam to be incident on a photo-sensitive region of a photodetector. In U.S. Ser. No. 673,764 filed on Nov. 21, 1984, abandoned, and in the corresponding EPC Application No. 84114044.5 filed on Nov. 20, 1984, a single light beam is separated by a knife edge or light shielding plate from a plurality of light beams to detect the focusing state of an objective lens and a tracking guide. However, in order to properly detect the focusing state by using the knife edge, the light receiving surface of the photodetector must be determined by an optical system arranged between the optical disk and the light receiving surface of the photodetector, and in the just-in-focus state, a beam spot image formed on the optical disk must be properly located on the focusing surface, i,e., the focal plane of the projection lens.

SUMMARY OF THE INVENTION

An object of the invention is to provide an optical system for tracking an information recording medium with multiple beams in which a focusing state of an objective lens can be accurately detected.

According to the invention, there is provided an optical system for optically recording information in and reproducing information from an information recording medium having a light reflecting surface, comprising:

means for generating at least first and second light beams;

an objective lens for converging the first and second light beams on an information recording medium, a beam spot corresponding to a beam waist of a first light beam emerging from an objective lens and being formed on the information recording medium when the objective lens is maintained in a just-in-focus state, and a beam spot larger than the beam spot corresponding to the beam waist being formed on the information recording medium when the objective lens is maintained in a defocusing state;

a first photodetector which receives the first and second light beams reflected by the information recording medium, which has a light receiving surface located substantially on an image forming plane having the beam spot corresponding to the beam waist of the first light beam, and which has first and second photosensitive regions and a photoinsensitive region which are formed on the light receiving surface; and means for transferring the first and second light beams and deflecting the first and second light beams in accordance with the distance between the objective lens and the light reflecting surface of the information recording medium, the first light beam being directed between the first and second photosensitive regions when the objective lens is maintained in the just-in-focus state and directed to one of the first and second photosensitive regions when the objective lens is maintained in the defocusing state, the second light beam being directed toward the photoinsensitive region at least when the objective lens is maintained in the just-in-focus state.

BRIEF DESCRIPTION OF THE DRAWINGS

FIG. 3 is a block diagram showing the detailed arrangement of the recording laser driver circuit shown in FIG. 1;

FIG. 4 is a block diagram showing a modification of the recording laser driver shown in FIG. 3;

FIG. 5 is a block diagram showing the detailed arrangement of the optical head shown in FIG. 1;

DETAILED DESCRIPTION OF THE PREFERRED EMBODIMENT

Figure 1:
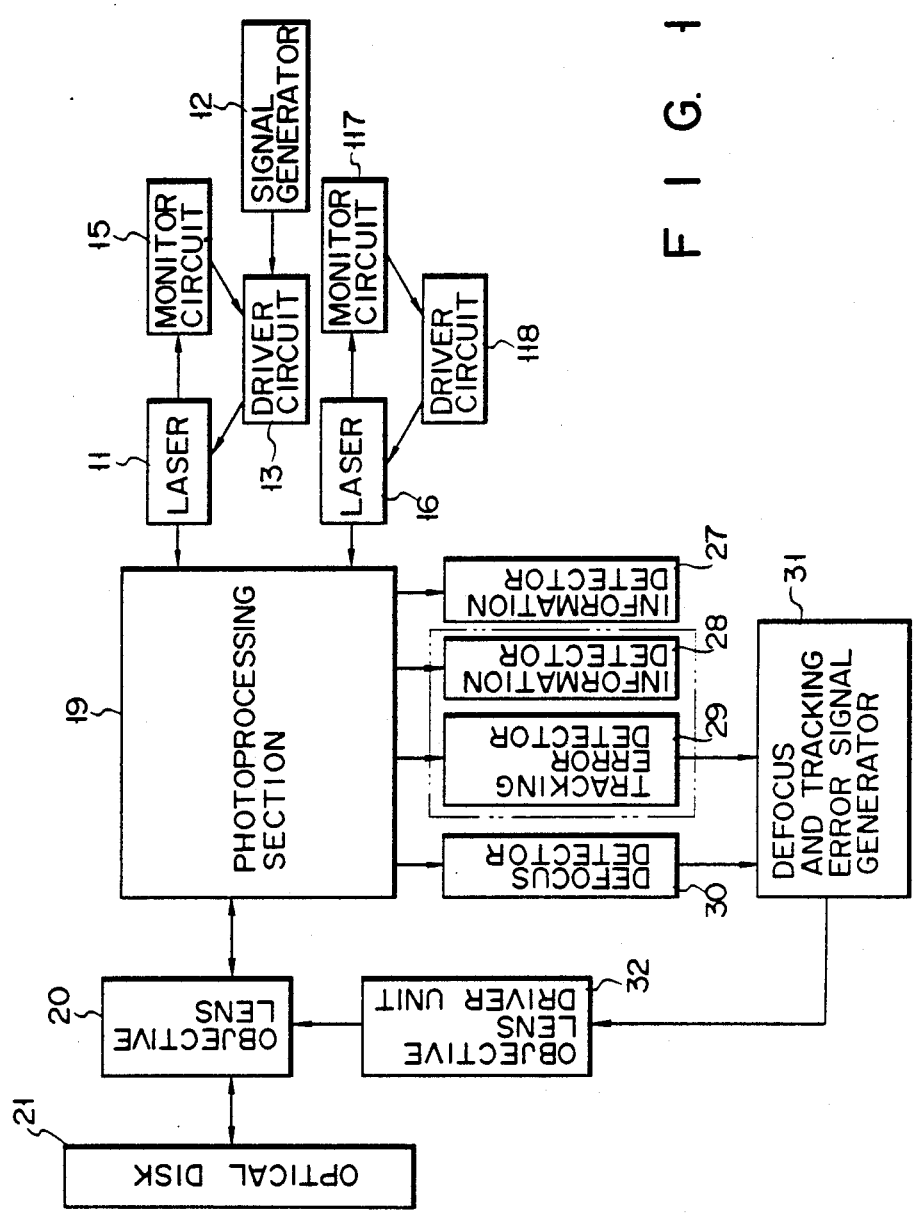
FIG. 1 is a block diagram schematically showing an optical head according to the present invention.

FIG. 1 is a block diagram of an optical head according to an embodiment of the present invention. In this optical head, a recording laser, e.g., a semiconductor laser 11, is driven by a recording laser driver circuit 13 in response to a recording signal from a recording signal generator 12 in the recording mode. A laser beam from the recording laser 11 is intensity-modulated in response to the recording signal. The modulated recording laser beam is supplied to a photoprocessing section 19 for mutliplexing a plurality of light beams and separating the multiplexed light beams. The recording laser 11 also generates a monitor laser beam in addition to the recording laser beam. The monitor laser beam is converted by a monitor circuit 15 into an electrical signal. This electrical signal is fed back as a feedback signal to the recording laser driver circuit 13. Therefore, recording laser 11 generates an intensity-modulated recording laser beam having a given intensity level.

The photoprocessing section 19 receives the reproduction and guide laser beams of the given constant level generated from a reproduction and guide laser 16 which is operated by a reproduction and guide laser driver circuit 118 in both the reproduction and recording modes. The laser 16 comprises a semiconductor device having two semiconductor laser structures formed on a semiconductor substrate and light emitting points spaced by a short distance from each other. The laser 16 also generates the monitor laser beam in addition to the reproduction and guide laser beams. The monitor laser beam is converted to an electrical signal by a reproduction and guide monitor circuit 117. This electrical signal is fed back as a feedback signal to the laser driver circiut 118. Therefore, the reproduction and guide laser 16 generates the reproduction and guide laser beams having a given constant intensity level.

The recording, reproduction and guide beams are multiplexed by the photoprocessing section 19 in the recording mode. The reproduction and guide laser beams are multiplexed by the photoprocessing section 19 in the reproduction mode. The multiplexed laser beams in the recording and reproduction modes are then transmitted through a single optical path and are incident on the objective lens 20.

Figure 2:
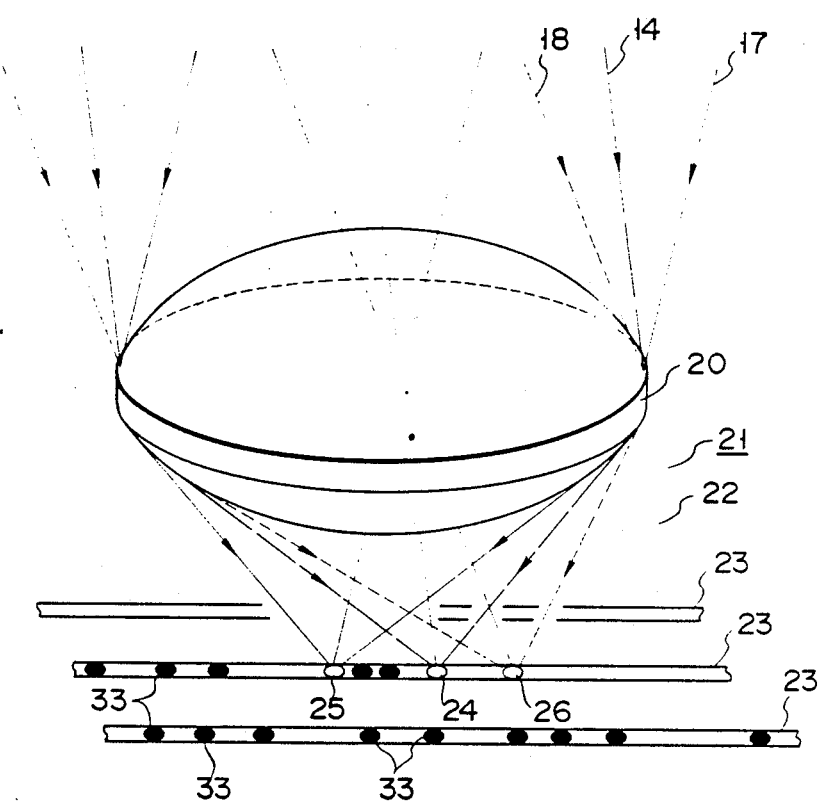
FIG. 2 is a perspective view showing a path of a laser beam in the objective lens system shown in FIG. 1.

As shown in FIG. 2, the multiplexed laser beam is focused by the objective lens 20 to form a beam spot on the light-reflecting surface (i.e., a recording surface 22) of the optical disk 21 which is subjected to recording-/reproduction. In the recording mode, when the objective lens is held in the just-in-focus state, recording, reproduction and guide spots 24, 25 and 26 corresponding to the recording, reproduction and guide laser beams are formed on a tracking guide 23 on the recording surface 22 at short intervals. In the reproduction mode, when the objective lens is held in the just-in-focus state, reproduction and guide beam spots 25 and 26 corresponding to the reproduction and guide laser beams are formed on the tracking guide 23 on the recording surface 22 at a short interval. When the optical disk 21 is rotated, the respective areas on the tracking guide 23 are sequentially traced in an order of the guide beam spot 26, the recording beam spot 24 and the reproduction beam spot 25. When the intensity of the recording laser beam exceeds a predetermined level, a characteristic change (e.g., formation of a pit or change of the optical characteristics such as a refractive index or a reflectance) occurs in the recording surface area on which the recording beam spot is formed. In this manner, the pit is formed on the recording surface in accordance with recording information, or the optical characteristics of the recording surface change. When the reproduction laser beam of a given constant level irradiates the recording surface 22, and the reproduction beam spot 25 traces the tracking guide 23, the reproduction beam is intensity-modulated in the area where the pit is formed or the optical characteristics such as a refractive index or reflectance change. When the guide beam spot reaches an area where supplementary information concerning track address and sector address is recorded as pits 33, the guide laser beam is intensity-modulated.

The laser beam reflected by the recording surface 22 passes through the objective lens 20 and is incident on the photoprocessing section 19. The laser beam is separated by the photoprocessing section 19 into the recording laser beam, the reproduction laser beam and the guide laser beam. The recording laser beam is attenuated or shielded. The reproduction laser beam is converted to an electrical signal. This electrical signal is supplied to an information detector 28 for reproducing information recorded in the recording surface 22 of the optical disk 21, a defocusing detector 30 for detecting a defocused state of the objective lens 20, and a photodetector in a tracking error detector 29 for detecting whether the laser beam properly tracks within the tracking guide 23. The guide laser beam is also incident on a photodetector of a supplementary information detector 27 for reproducing supplementary information (concerning the track address and the sector address) recorded on the recording surface 22 of the optical disk 21. Signals from the defocus detector 30 and the tracking error detector 29 are supplied to a defocus and tracking error signal generator 31 to be converted into a defocus signal and a tracking error signal which are supplied to an objective lens driver unit 32. The objective lens driver unit 32 moves the objective lens along the optical axis thereof and moves the objective lens 20 in a direction perpendicular to the tracking guide. The objective lens 20 is thus maintained in the just-in-focus state and is oriented in a direction so as to cause the laser beam to properly trace the tracking guide.

The recording laser driver circuit 13 has the detailed arrangement shown in FIG. 3. The recording laser 11 is connected to a constant voltage source 39 through a gate 40 and a current/voltage converter 41. The current/voltage converter 41 is connected to a switching circuit 42. The switching circuit 42 is operated to connect a reference voltage generator 43 to the current/voltage converter 41 when the recording laser circuit 13 is driven. The current/voltage converter 41 is thus operated by a reference voltage applied from the reference voltage generator 43 when the recording laser driver circuit 13 is driven. The gate 40 is connected to the recording signal generator 12 and is enabled/disabled in response to the recording signal generated therefrom. A light intensity modulating voltage is converted by the current/voltage converter 41 to a current signal, and the current signal is supplied to the recording laser 11. The recording laser 11 generates a laser beam in accordance with the recording signal. The switching circuit 42 also is operated to connect the current/voltage converter 41 to a comparator 45 after the recording laser driver circuit 13 is started. The recording signal generator 12 is also connected to a sample/hold circuit 44. The sample/hold circuit 44 is connected to a monitor circuit 15 for monitoring the laser beam generated from the recording laser 11. Therefore, every time the ON signal is generated from the recording signal generator 12, a monitor output from the monitor circuit 15 is sampled by the sample/hold circuit 44. In other words, every time the laser beam is generated from the recording laser 11, the light intensity is sampled. The sample output is compared by the comparator 45 with the reference voltage from the reference voltage generator 43. A comparison result is supplied to the current/voltage converter 41 through the switching circuit 42. The current flowing from the current/voltage converter 41 to the recording laser 11 is adjusted such that the output laser beam from the recording laser 11 is constant. As shown in FIG. 4, a peak detector may be used in place of the sample/hold circuit 44 of FIG. 3. In this case, a peak of the monitor output from the monitor circuirt 15 may be sampled by the peak detector 46.

Figure 6:
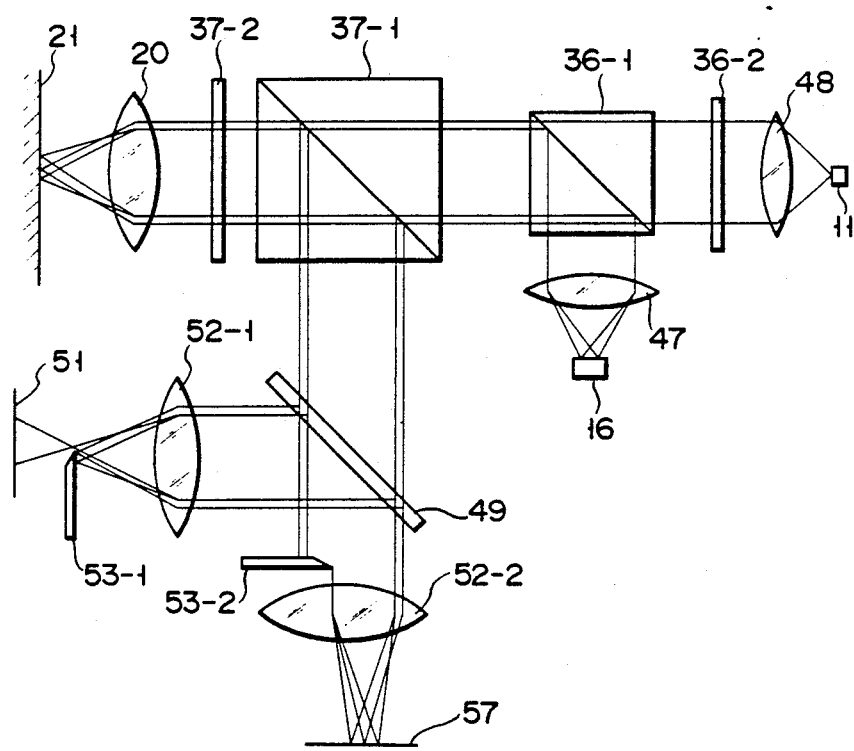
FIG. 6 is a schematic view showing the optical system of the optical head shown in FIG. 5.

A laser 34 for generating a single laser beam, as shown in FIG. 5, may be used in place of the reproduction and guide laser 16 shown in FIG. 1. In this case, the laser beam is split by a beam splitter 35 such as a biprism into the reproduction and guide laser beams. As also shown in FIG. 5, the photoprocessing section 19 comprises an optical multiplexer 36 for multiplexing a plurality of laser beams, an optical isolator 37 for preventing the laser beam from returning to the lasers 11 and 34, a half mirror 49 for splitting the laser beams into first and second laser beams, and first and second laser beam separators 38-1, 38-2 for separating the multiplexed laser beams. More specifically, as shown in FIG. 6, the optical multiplexer 36 comprises a dichroic prism 36-1 and a filter 36-2. The optical isolator 37 comprises a polarizing beam splitter 37-1 and a λ/4 plate 37-2. The first laser beam separator 38-1 comprises a knife edge 53, and the second laser beam separator 38-2 is formed in a photodetector 57 as described later.

In the optical system shown in FIG. 6, the reproduction and guide laser beams from the reproduction and guide laser 16 are collimated by a collimator lens 47. A collimated light beam is incident on the dichroic prism 36-1. The reproduction and guide laser beams have a wavelength of 780 nm. This laser beam passes through the dichroic prism 36-1 and is incident on the polarizing beam splitter 37-1. The recording laser beam emitted from the recording laser 11 is collimated by a collimator lens 48 in the same manner as described above. This collimated laser beam is also incident on the dichroic prism 36-1. The recording laser beam has a wavelength of 830 nm. Like the reproduction and guide laser beams, the recording laser beam is reflected by the dichroic prism 36-1 and is incident on the polarizing beam splitter 37-1 through the same optical path as the reproduction and guide laser beams. The recording, reproduction and guide laser beams generated from the polarizing beam splitter 37-1 are incident on the objective lens 20 through the λ/4 plate 37-2 and are focused by the objective lens 20 to form the corresponding recording, reproduction and guide beam spots 24, 25 and 26 on the recording surface 22. The laser beams reflected from the recording surface 22 are then incident on the polarizing beam splitter 37-1 through the objective lens 20 and the λ/4 plate 37-2. When the laser beam reciprocates through the λ/4 plate 37-2, the plane of polarization of the laser beam is rotated through 90 degrees. As a result, the laser beam is reflected by the polarizing beam splitter 37-1.

The recording, reproduction and guide laser beams reflected from the polarizing beam splitter 37-1 are splitted into first and second light beams by the half mirror 49. The first laser beams are converged by a projection lens 52-1 and separated by the first knife edge 53-1 into first recording, reproduction and guide laser beams. The first recording and guide laser beams are attenuated, reflected or shielded by the first knife edge 53-1. The first reproduction laser beams are incident on a first photodetector 51 acting as the information and tracking error detector 28, 29. The second laser beams splitted by the half mirror 49 are directed to the second knife edge 53-2. Some of the laser beams are shielded by the second knife edge 53-2, and the remaining laser beams are directed toward the projection lens 52-2. The latter laser beams are converged by the projection lens 52-2 and incident on the light receiving surface of the second photodetector 57. In a manner to be described later, second recording laser beams of the second light beams are incident on the photoinsensitive region of the second photodetector 57 acting as the defocusing and supplementary information detectors 54 and 27. The first recording, reproduction and guide laser beams, on the other hand, are incident on the photosensitive regions of the second photodetector 57.

An optical system of the first beam separator 38-1, the information detector 28 and the tracking error detector 29 will be described in detail with reference to FIGS. 7 and 8. In the arrangement shown in FIGS. 7 and 8, the knife edge or the light-shielding plate 53-1 is located in beam waists of the first recording, reproduction and guide laser beams which are determined by the projection lens 52 in the just-in-focus state. The beam waists of the recording and guide beams are formed on the knife edge or the light-shielding plate 53-1. More specifically, the knife edge is inserted from the Y direction and extends along the X direction in such a manner that the edge is aligned with the optical axis of the projection lens 52-1. The Y direction is defined as a direction along which an image of the tracking guide of the optical disk extends when it is projected to the photodetector 51 by an optical system arranged between the recording surface 22 (i.e., the light-reflecting surface) of the optical disk 21 and the photodetector 51. The X direction is defined as a direction perpendicular to the Y direction.

As previously described, the recording, reproduction and guide laser beams are focused to form the beam spots 24, 25 and 26 on the tracking guide 23 of the recording surface 22 at very short intervals when the objective lens is held in the just-in-focus state. The first recording laser beam 14, the first reproduction laser beam 17 and the first guide laser beam 18 which are reflected by the areas having the beam spots 24, 25 and 26 are transmitted to the projection lens 52-1 through the objective lens 20 and are not parallel to main light beams W, R and P but are inclined with respect thereto, as shown in FIGS. 7 and 8, respectively. Therefore, beam waists are formed at different positions on the focal surface of the projection lens 52-1. Since the first knife edge or light-shielding plate 53-1 is positioned such that the recording and guide beam spots are formed on the knife edge or light-shielding plate 53-1, only the first reproduction leaser beam 17 is incident on the photodetector 51 of the information detector 28 and the tracking error detector 29. Therefore, the photodetector 51 detects the recording signal representing information and the tracking signal representing a tracking error.

Figure 7:
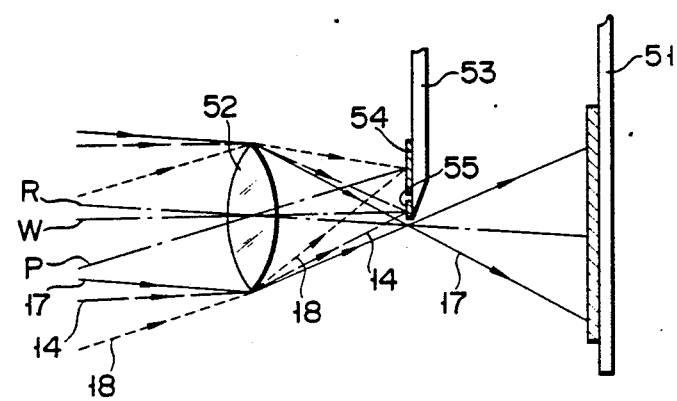
FIGS. 7 and 8 are respectively a side view and a perspective view of a first optical separator for separating multiplexed laser beams into a recording laser beam, a reproduction laser beam and a guide laser beam.
Figure 8:
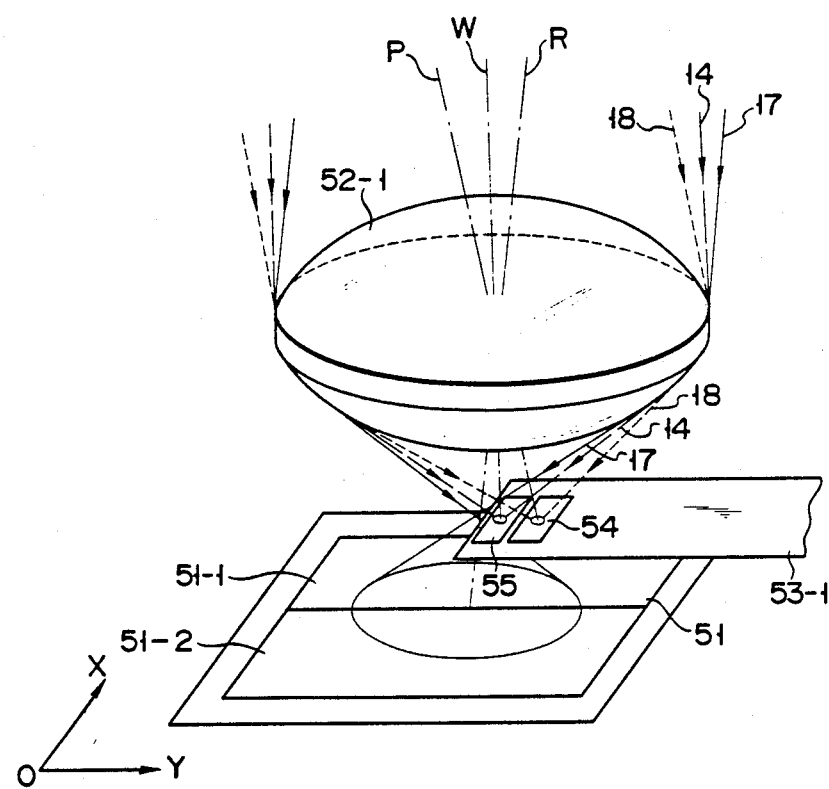

In the arrangement shown in FIGS. 7 and 8, nondetecting portions or light-attenuating portions 54, 55 are formed on the surface of the first knife edge or light-shielding plate 53-1 on which the recording and guide laser beams are formed in the just-in focus state. Thus, the recording and guide laser beams are shielded or attenuated by the nondetecting portions 55, 54.

The photodetector 51 acting as the information detector 28 and the tracking error detector 29 has first and second rectangular photodetecting regions 51-1 and 51-2 which are arranged along the X direction. The first and second rectangular photodetecting regions 51-1 and 51-2 are located such that principle light ran R of the reproduction laser beam 17 is directed to a region between the first and second rectangular photodetecting regions 51-1 and 51-2. In the photodetector 51, first and second detection signals having level L1 and L2 are generated from the photodetecting regions 51-1 and 51-2, respectively.

The reproduction signal is obtained by adding the first and second detection signals having the levels L1 and L2 reproduced from the photodetecting regions 51-1 and 51-2, thereby obtaining a sum signal (L1+L2) and hence reproducing the information recorded in the recording surface 22 of the optical disk 21. The tracking error signal, on the other hand, is obtained as a difference signal (L1−L2) between the detection signals having the levels L1 and L2.

When the laser beam properly traces the tracking guide, the objective lens 20 is operated such that a diffraction pattern of the tracking guide 23 is formed on a light-receiving surface of the photodetector 51 in a symmetrical manner about an axis of the photodetector 51 parallel to the Y-axis. Therefore, the tracking error signal (L1−L2) is substantially zero. However, when the laser beam does not properly trace the tracking guide, the diffraction pattern of the tracking guide 23 is formed on the light-receiving surface of the photodetector 51 in a asymmetrical manner about the axis of the photodetector 51 parallel to the Y-axis. Then, the tracking error signal (L1−L2) does not become zero but represents a negative or positive value. This tracking error signal is supplied to the objective lens driver unit 32, the objective lens 20 is oriented such that the laser beam therefrom properly tracks within the tracking guide.

Figure 9:
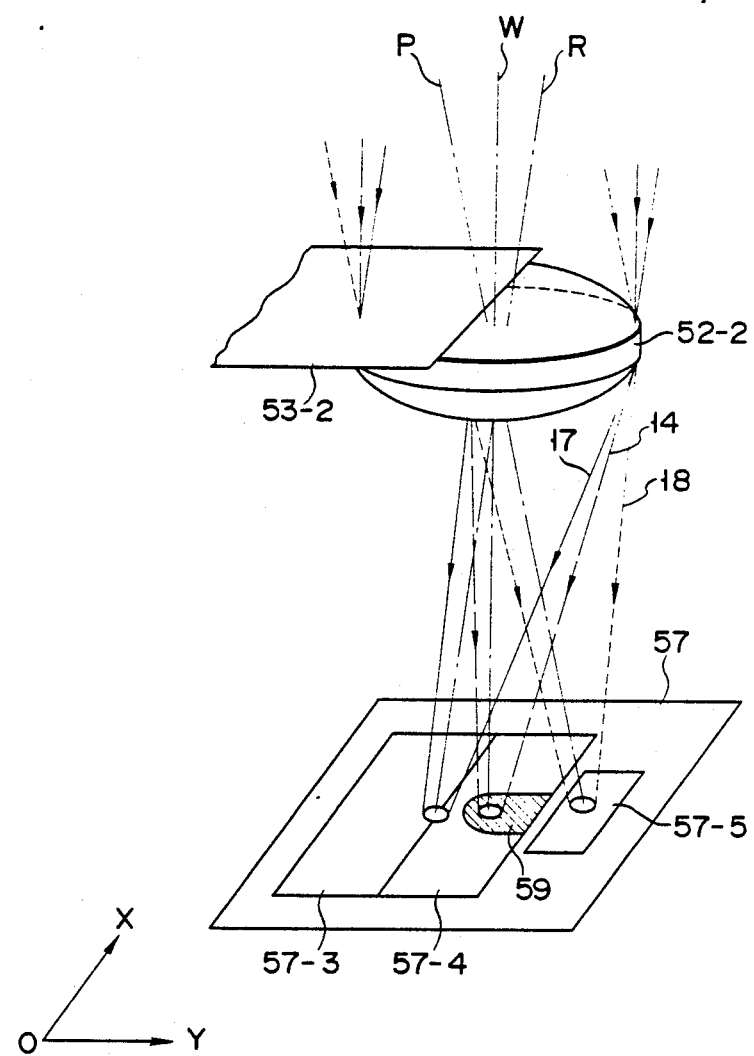
FIG. 9 is a perspective view showing a second optical separator for separating the multiplexed laser beams into a recording laser beam, a reproduction laser beam and a guide laser beam.

The optical system of the second beam separator 38-2, the defocus detector 30 and the information detector 27 will be described in detail hereinafter. In the embodiment shown in FIG. 9, unlike the optical systems shown in FIGS. 7 and 8, a light receiving surface of the second photodetector 57 serving as the defocus detector 30 and the information detector 27 is located in the focal plane of the recording, reproduction and guide laser beams determined by the just-in-focus state of the projection lens 52. A knife edge for detecting the focusing state or a light shielding plate 53-2 is inserted in an optical path so as to pass the second laser beams between the half mirror 49 and the second photodetector 57. As shown in FIG. 9, the second photodetector 57 comprises third and fourth photosensitive regions 57-3 and 57-4 which receive the second reproduction laser beam to detect the focusing state, a fifth photosensitive region 57-5 which receives the second guide laser beam to detect the prebeam, and a photoinsensitive region 59 which receives the second recording laser beam. In the embodiment shown in FIG. 9, the knife edge is inserted in the optical path from the Y direction to extend in the X direction. The third and fourth photosensitive regions 57-3 and 57-4 are arranged along the insertion direction of the knife edge, i.e., along the Y direction.

As described with reference to FIGS. 7 and 8, the principle light rays W, R and P of the second recording laser beam 14, the second reproduction laser beam 17 and the second guide laser beam 18 which are transmitted from the objective lens 20 to the projection lens 52-2 through the half mirror 49 are not parallel but slightly inclined, so that beam spots are formed at different positions of a single plane, i.e., the focusing plane of the projection lens 52-2. The light receiving surface of the second photodetector 57 is located such that the beam spots of the second recording, reproduction and guide beams in the just-in-focus state are formed on the light receiving surface of the second photodetector 57. The third and fourth photosensitive regions 57-3 and 57-4, the fifth photosensitive regions 57-5 and the photoinsensitive region 59 are located such that the principle light beam R of the reproduction laser beam 17 passes between the third and fourth photosensitive regions 57-3 and 57-4, the principle light beam P of the guide beam passes through the fifth photosensitive region 57-5, and the principle light beam W of the recording laser beam passes through the photoinsensitive region 59. In other words, the third and fourth photosensitive regions 57-3 and 57-4, the fifth photosensitive region 57-5 and the photoinsensitive region 59 are located such that the reproduction laser beam spot is formed on the third and fourth photosensitive regions 57-3 and 57-4, the guide beam spot is formed on the fifth photosensitive region 57-5, and the recording beam spot is formed on the photoinsensitive region 59. In the embodiment shown in FIG. 9, the photoinsensitive region 59 is formed on one of the third and fourth photosensitive regions 57-3 and 57-4.

The reproduction laser beam 17 is detected by the third and fourth photosensitive regions 57-3 and 57-4 and is converted to a defocusing signal. The recording laser beam is shielded or attenuated by the photoinsensitive region 59. The guide laser beam is detected by the fifth photosensitive region 57-5 and converted to a preliminary information electrical signal concerning track and sector addresses. The third and fourth detection signals having the levels L3 and L4 are generated from the third and fourth photosensitive regions 57-3 and 57-4 of the photodetector 57, and a difference therebetween is generated as a defocus detection signal. In other words, the defocus detection signal is given as a difference signal (L3−L4).

When the objective lens 20 is maintained in the just-in-focus state wherein a minimum beam spot corresponding to a beam waist of the laser beam focused by the objective lens 20 is formed on the recording surface 22 of the optical disk 21, the beam spot of the reproduction laser beam 17 which is formed by the projection lens 52-2 is formed on the third and fourth photosensitive regions 57-3 and 57-4, as shown in FIG. 9. As a result, the defocus detection signal (L3−L4) becomes substantially zero. In the defocusing state wherein the objective lens is shifted away from the optical disk 21, the beam spot of the reproduction laser beam 17 which is formed by the projection lens 52 is formed between the second photodetector 57 and the photodetector 51. In this case, a relatively large beam spot is formed on the fourth photosensitive region 57-4. As a result, the defocus detection signal is not zero but has a negative value. In the defocusing state wherein the objective lens 20 has been shifted closer to the optical disk 21 with respect to the just-in-focus position, the beam of the reproduction laser beam 17 which is formed by the projection lens 52 is not formed on the second photodetector 57 or between the second photodetector 57 and the projection lens 52. In this case, a relatively large beam spot is formed on the third photosensitive region 57-3. As a result, the defocus detection signal (L3−L4) is not zero but has a positive value. In this manner, since the defocus detection signal is supplied to an objective lens driver unit 32, the objective lens 20 is always maintained in the just-in-focus state.

In the embodiment described above, the knife edge 53-2 is used as a light beam extracting member. However, a prism, mirror or lens may be used as the light beam extracting member instead of the knife edge 53-2.

Figure 10:
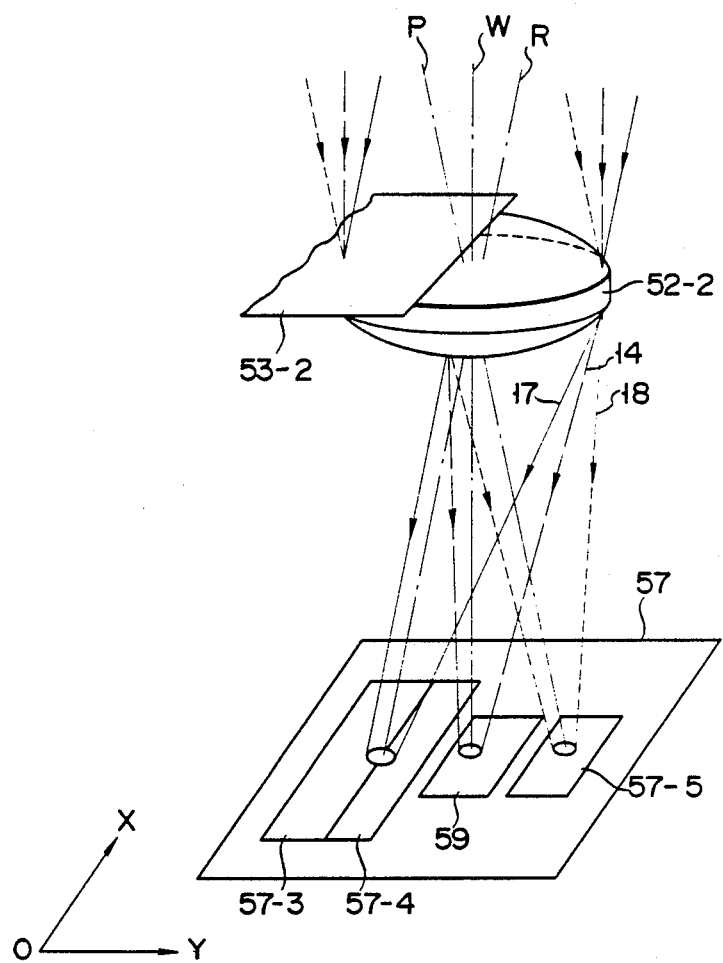
FIGS. 10 and 11 are perspective views showing another arrangement of a second optical separator for separating the multiplexed laser beams into a recording laser beam, a reproduction laser beam and a guide laser beam.

When the beam spots of the recording, reproduction and guide beams which are formed on the light receiving surface of the photodetector 57 are relatively spaced apart from each other in the just-in-focus state, the photoinsensitive region 59 is not formed on one of the third and fourth photosensitive regions 57-3 and 57-4. As shown in FIG. 10, the photoinsensitive region 59 may be formed in a region between the third and fourth photosensitive regions 57-3 and 57-4 and the fifth photosensitive region 57-5, which is different from a region of the light receiving surface of the photodetector 57 having the third, fourth and fifth photosensitive regions 57-3, 57-4 and 57-5.

The photoinsensitive region 59 can be formed as a light reflecting or absorbing film on the light receiving surface of the photodetector 57. The light reflecting film can comprise Al, Cr, Au or the like and can be formed by vacuum deposition to a thickness of 500 Å or more, preferably 2,000 to 5,000 Å. The light absorbing film can comprise carbon or a colorant. Part of the light receiving surface of the photodetector 57 can be etched.

Figure 11:
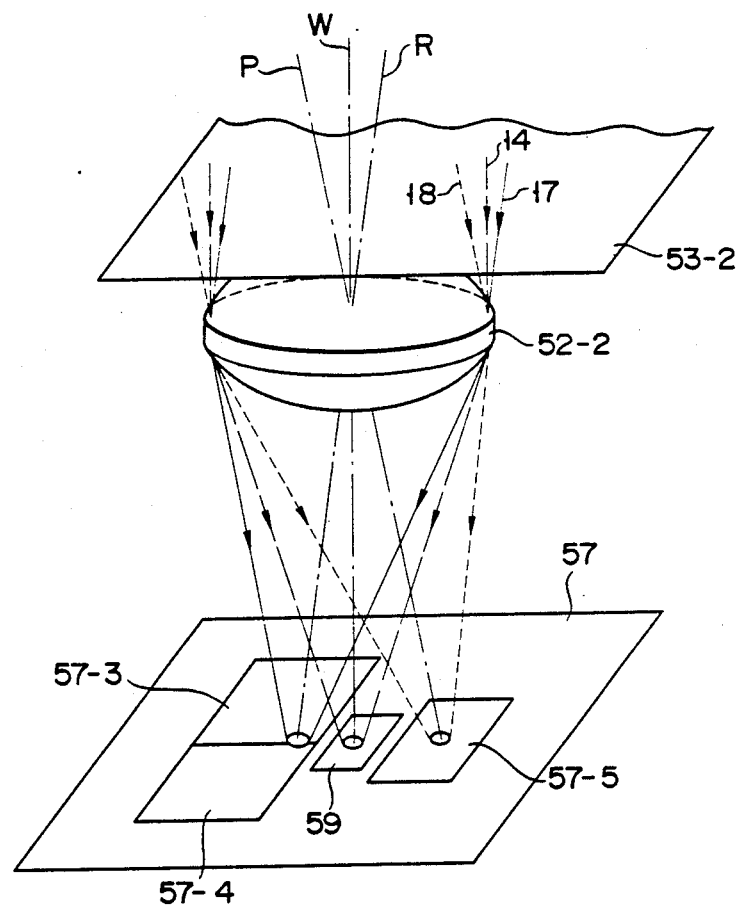

The photoinsensitive regions 59 can be formed as shown in FIG. 11 wherein part of the photodetector 57 is made of a transparent member, and an anti-reflecting coating can be formed on the transparent member on the light receiving surface of the photodetector 57. When the recording laser beam is incident on the photoinsensitive region 59 on the light receiving surface of the photodetector 57, the recording laser beam is not subjected to irregular reflection from the photoinsensitive regions 59 but transmitted therethrough and guided outside the photoinsensitive region 59. In this manner, part of the laser beam is not irregularly reflected or scattered and does not become incident on the photosensitive regions, thereby preventing noise.

The tracking guide photodetector 51 is located on a far field plane excluding the focusing surface, i.e., the focal plane of the projection lens 52-1. The defocusing state detection photodetector 57 is located on the focusing plane, i.e., the focal plane of the projection lens 52-2. The recording, reproduction and guide laser beams are separately incident on either photodetector. Therefore, the tracking guide and the focusing state can be accurately detected.

What is claimed is:

1. An optical system for tracking an information recording medium having a light reflecting surface, comprising:
    means for generating first and second light beams;
    an objective lens for converging said first and second light beams onto said light reflecting surface and for converging first and second divergent light beams reflected by said light reflecting surface, a beam spot corresponding to a beam waist of said first light beam being formed on said light reflecting surface when said objective lens is in a just-in-focus state, and a beam spot larger than that of the beam spot corresponding to the beam waist of said first light beam being formed on said light reflecting surface when said objective lens is in an out-of-focus state;
    means for directing the reflected first and second light beams from said objective lens, said first reflected light beam being deflected in accordance with the distance between said objective lens and said light reflecting surface; and
    a first photodetector with a light receiving surface substantially located on an image forming plane on which an image of the beam spot corresponding to the beam waist of the first light beam is formed, said light receiving surface including first and second photosensitive regions and a photoinsensitive region, the reflected first light beam being directed between said first and second photosensitive regions when said objective lens is in the just-in-focus state and directed to one of said first and second photosensitive regions when said objective lens is in the out-of-focus state, and the second light beam being directed toward said photoinsensitive region when said objective lens is in the just-in-focus state.

2. A system according to claim 1, wherein said light beam generating means comprises means for generating laser beams.

3. A system according to claim 1, wherein said directing means includes a projection lens for projecting the reflected first and second light beams onto the light receiving surface of said first photodetector.

4. A system according to claim 1, wherein said light receiving surface of said first photodetector further includes a third photosensitive region.

5. A system according to claim 4, wherein said light beam generating means comprises means for generating a third light beam, said objective lens converging said third light beam onto said light reflecting surface and converging a third divergent light beam reflected by said light reflecting surface, said directing means directing the reflected third light beam toward said third photosensitive region of said first photodetector when said objective lens is in the just-in-focus state.

6. A system according to claim 5, wherein said directing means includes means for extracting a part of said reflected first, second and third light beams.

7. A system according to claim 1, wherein said directing means includes means for extracting a part of said reflected first and second light beams.

8. A system according to claim 7, wherein said extracting means includes a knife edge located between the objective lens and said first photodetector.

9. A system according to claim 1, further comprising a second photodetector with a light receiving surface including third and fourth photosensitive regions.

10. A system according to claim 9, wherein said directing means includes means for splitting both the first and second reflected light beams into a first split set of the first and second reflected light beams directed toward said light receiving surface of said first photodetector, and a second split set of the first and second reflected light beams directed toward said light receiving surface of said second photodetector.

11. A system according to claim 10, wherein said directing means further includes means for extracting a component of the first reflected beam from the second split set of the first and second light beams, the first reflected beam component being detected by said second photodetector.

12. A system according to claim 11, wherein said extracting means includes a projection lens for projecting the second split set of the first and second light beams onto the light receiving surface of said second photodetector.

13. A system according to claim 11, wherein said extracting means includes a knife edge located substantially on an image forming plane on which an image of the beam spot corresponding to the beam waist of the first light beam is formed, said kinfe edge passing only the first reflected light beam component to said second photodetector.

14. A system according to claim 13, wherein said first reflected light beam component is incident on said third and fourth photosensitive regions of said second photodetector, said third and fourth regions forming first and second detection signals, respectively, a difference between the levels of said first and second detection signals indicating a tracking error.

15. A system according to claim 1, wherein said photoinsensitive region comprises an anti-reflection film formed on said light receiving surface of said first photodetector.

16. A system according to claim 1, wherein said photoinsensitive region comprises a light absorbing film formed on said light receiving surface of said first photodetector.

17. A system according to claim 1, wherein said first photodetector has a light transmitting section, said photoinsensitive region being defined as a region on a light receiving surface of said light transmitting section.

18. A system according to claim 1, wherein said photoinsensitive region is formed on one of said first and second photosensitive regions.

19. A system according to claim 1, wherein said photoinsensitive region is formed separately from said first and second photosensitive regions.

* * * * *